UNITED STATES PATENT OFFICE.

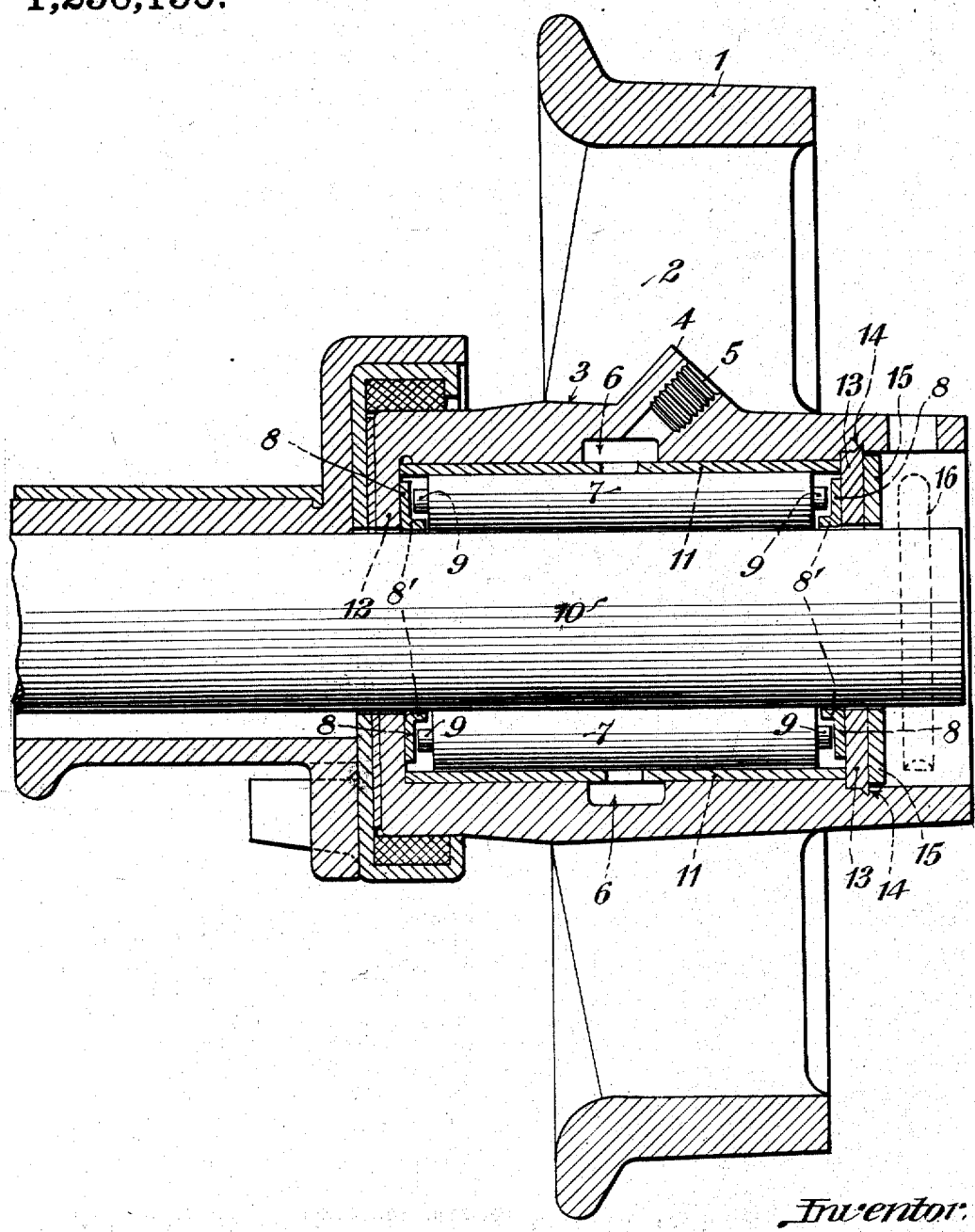

JOHN LEE McDOWELL, OF BERWICK, PENNSYLVANIA, ASSIGNOR TO AMERICAN CAR AND FOUNDRY COMPANY, OF NEW YORK, N. Y., A CORPORATION OF NEW JERSEY.

CAR-WHEEL WITH PERMANENTLY-RETAINED ROLLER-BEARING.

1,256,150.

Specification of Letters Patent.

Patented Feb. 12, 1918.

Application filed September 5, 1917. Serial No. 189,862.

*To all whom it may concern:*

Be it known that I, JOHN LEE MCDOWELL, residing at Berwick, Columbia county, State of Pennsylvania, and being a citizen of the United States, have invented certain new and useful Improvements in Car-Wheels with Permanently-Retained Roller-Bearings, of which the following is a full, clear, and exact description, such as will enable others skilled in the art to which it appertains to make and to use the same, reference being had to the accompanying drawing, which illustrates the preferred form of the invention, though it is to be understood that the invention is not limited to the exact details of construction shown and described, as it is obvious that various modifications thereof within the scope of the claims will occur to persons skilled in the art.

In said drawing the single figure illustrates my improved car wheel in vertical section, showing its relation with its associated journal box.

This invention relates to details of construction of roller bearing wheels, adapted for mine car service, and comprises certain features of novelty hereinafter particularly pointed out and specifically recited in the claims.

Referring to the parts, 1 indicates the tread, 2 the spokes and 3 the hub of a mine car wheel, which latter is provided with a boss or stud 4 internally screw-threaded at 5 for temporary connection therewith of a grease gun adapted to force lubricant into the lubricating chamber 6, from which latter the lubricant is conducted to the loose rollers 7 which are free to rotate within the wheel hub independently of, although supported in position by, end annuli 8, which are flanged inwardly, as at 8', parallel with and lapping spindles 9 of the rollers 7 so as to support said rollers when the wheel is removed from its axle 10. Extending longitudinally within the roller bearing assembly of the wheel, is a sleeve or bushing 11 which contacts with the rear wall 12 of the wheel hub at one end and with an inserted washer 13 at the opposite end, thereby filling the space between said wall 12 and the washer 13 and preventing the possibility of any part of the roller bearing assembly becoming locked, due to displacement, and preventing consequent disintegration of the roller bearing assembly.

The problem of lubricating mine car wheels is a difficult one due to the desire of the operators to retain the present standards of equipment, which have been built to conform to established clearance diagrams and also to the practice in the several mines, in many of which no brakes are used upon the cars and spragging is resorted to to check the speed of the cars upon the inclines. With the wheels of small diameter which are used in mine cars, an excessively large hub would prevent spragging and it is desirable that the hub of the wheel shall be of as small diameter as is practicable, consistent with suitable lubrication, and that the lubricant shall be retained within the hub as long as it possesses any lubricating value. To that end, the annuli 8 are designed, as shown, to provide but a minimum clearance between their inner flanges 8' and the axle 10 to retard the flow of lubricant which might be entrained along the axle and otherwise escape at the inner or outer end of the wheel hub.

An additional precaution against the loss of lubricant has been provided in the present invention which consists of peening the outer edge portion of the washer 13 into a suitable annular groove of small dimension provided therefor, as is indicated at 14 in the drawings. This peening operation may be accomplished by the use of the ordinary peening chisel after the washer 13 has been placed in position, with the result that said washer becomes a relatively, though not absolutely, permanent part of the wheel assembly, and the possibility of loss of lubricant between the outer perimeter of this washer and the inner face of the wheel hub bore is prevented.

To prevent excessive wear of the washer 13, a washer 15 is interposed between the cotter pin 16 and said washer 13. While the cotter pin 16 is shown as a means for securing the wheel upon the axle, it is to be noted that any convenient means may be adapted for that purpose, unless the washer 13 is secured in position as noted, though where the washer 13 is peened into permanent position the cotter pin is preferred. If the wheel should become broken or otherwise unfit for use, the washer 13 may be removed by destructive effort and the several parts of the roller bearing assembly removed for subsequent use in another wheel, if desired.

What I claim is:

1. In combination, a car wheel with a hub having an inner end wall and provided with an enlarged bore and an open outer end, a bushing in said bore, an axle extending through said inner wall and beyond said bushing, friction-reducing means intermediate said axle and bushing and a washer penetrated by said axle and interlocking with the wall of the bore locking said bushing and friction-reducing means in position.

2. In combination, a car wheel with a hub having an inner wall and provided with an enlarged bore and an open outer end, a bushing in said bore, an axle extending toward the open hub end, friction-reducing means interposed between said axle and bushing, a separately formed annulus penetrated by said axle and expanded into and unyieldingly retained by the wall of the bore locking said bushing and friction-reducing means in position, and wheel-retaining means on said axle outside said annulus.

3. In combination, a car wheel having a hub with an enlarged bore and an open outer end, an axle extending into said bore, friction-reducing means in said bore surrounding said axle, the wall of the bore having a depression therein beyond said friction-reducing means and a hole beyond said depression, a separately formed annulus penetrated by said axle and expanded into and seated in said depression against yielding, retaining said friction-reducing means, and wheel-attaching means passable through said hole and secured to said axle.

4. In combination, a car wheel having a hub provided with an enlarged bore, an open outer end and a hole through the bore wall near that end, friction-reducing means in said bore, a separately formed annulus expanded into and locked in the bore wall beyond the outer end of said means to retain the same, an axle engaging said means and projecting beyond said annulus, a wheel-attaching device passable through said hole and secured to said axle and a washer loosely mounted on said axle between said annulus and device.

5. In combination, a car wheel having a hub with an inner wall and provided with an open outer end and a bore enlarged near that end to form a shoulder, there being an internal depression in the wall of the enlarged bore portion, a bushing in said bore between said shoulder and inner wall, an axle extending through said inner wall and beyond said bushing, friction-reducing means intermediate said axle and bushing, a washer bearing against said shoulder and deformed to be seated in said depression locking said bushing and friction-reducing means in position, and wheel-attaching means on said axle outside said washer.

6. In combination, a car wheel with a hub having an inner wall and provided with an open outer end, an enlarged bore and a lubricant chamber communicating with the hub exterior, a bushing perforated to establish communication between said chamber and bore, an axle, rollers intermediate said axle and bushing, axle-penetrated positioning annuli for opposite ends of said rollers in sufficiently close relation to said axle to retard the escape of lubricant, and a washer insertible through the open hub end and self-interlocked with the bore wall to position said bushing, rollers and annuli.

In witness whereof I have hereunto set my hand in the presence of two witnesses.

JOHN LEE McDOWELL.

Witnesses:
MARY E. BRUFF,
THOS. B. HUYCK.